United States Patent [19]

Mannaka et al.

[11] 3,887,452

[45] June 3, 1975

[54] OPTIMUM ELECTROPLATING PLANT CONTROL DEVICE

[75] Inventors: Toshio Mannaka; Hidehiro Kitanosono; Shigemichi Matsuka, all of Hitachi, Japan

[73] Assignee: Hitachi, Ltd., Japan

[22] Filed: Oct. 31, 1972

[21] Appl. No.: 302,402

[30] Foreign Application Priority Data
Nov. 4, 1971  Japan............................ 46-87194

[52] U.S. Cl............................... 204/211; 204/228
[51] Int. Cl. .......................... C23b 5/68; B01k 3/00
[58] Field of Search ........ 204/211, 228; 323/22, 68, 323/16

[56] References Cited
UNITED STATES PATENTS

| | | |
|---|---|---|
| 2,734,858 | 2/1956 | Bachman et al.................... 204/211 |
| 3,371,231 | 2/1968 | Burley............................. 323/68 UX |
| 3,564,293 | 2/1971 | Mungenast....................... 323/68 X |
| 3,622,849 | 11/1971 | Kelley, Jr.......................... 323/16 X |
| 3,723,285 | 3/1973 | Daga et al........................... 204/228 |

Primary Examiner—John H. Mack
Assistant Examiner—D. R. Valentine
Attorney, Agent, or Firm—Craig & Antonelli

[57] ABSTRACT

A control device provided with a memory for determining and memorizing a critical breakdown temperature of the component elements of the control device in order to use them to the best advantage in, say, a galvanizing process, thereby to control the output current of the control device in accordance with the difference between the critical breakdown temperature and an actually detected temperature of the component elements.

6 Claims, 3 Drawing Figures

OPTIMUM ELECTROPLATING PLANT CONTROL DEVICE

BACKGROUND OF THE INVENTION

1. Field of the Invention

This invention relates to an optimum control device provided with, say, a thyristor or other current-controlling element for utilizing to the best advantage the control device for galvanizing or other plants.

2. Description of the Prior Art

The operation of the prior art plant control device is such that the required current control has been effected within the rated value of a factor such as an electric current which affects the temperature of the control device. Every control device, however, has its own critical breakdown temperature which is considerably higher than the temperature generated by the rated current. In the prior art control device, therefore, it is common practice to operate the control device at a temperature considerably below the critical breakdown temperature, thus preventing the control device from being operated to the best of its ability.

SUMMARY OF THE INVENTION

Accordingly, it is an object of the present invention to provide a control device which operates so efficiently that its temperature is allowed to increase to a level immediately below the critical breakdown temperature of the control device for controlling the electric current that is an electric current causing a temperature increase in the processes of, say, galvanization.

DESCRIPTION OF THE PREFERRED EMBODIMENT

Figure 1:
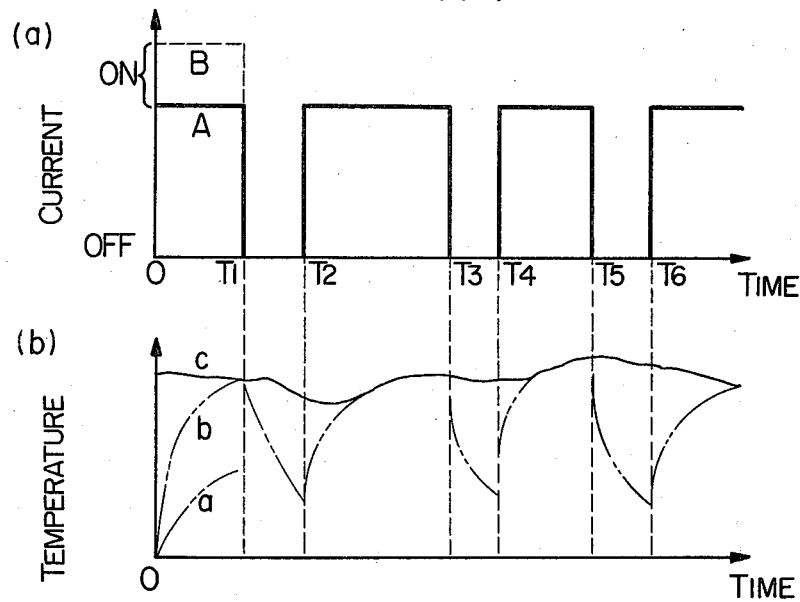
FIG. 1 is a diagram showing the characteristics of the electric current flowing in the control device according to the present invention and the corresponding temperatures thereof.

Referring to FIG. 1 showing the principle of the present invention, explanation is made of a case in which it is known in advance that the on-off cycle shown at (a) in FIG. 1 of the current source is longer than a predetermined length of time.

It is here assumed that the chronological variation in the level of the critical breakdown temperature of the control device calculated on the basis of such input on-line data as the temperature of cooling water, the air flow rate in the blower and the ambient temperature is as shown in curve $c$ of (b) of FIG. 1. If the increase in temperature of the control device is shown in curve $a$ of (b) when the current for the period 0 to T, is given by A of (a), there is a considerable difference between the actual temperature of the control device and the critical breakdown temperature, resulting in an inefficient operation thereof. If the critical breakdown temperature of the control device is known, it is possible to increase the temperature thereof in accordance with the characteristics curve $b$ of (b), thereby permitting the current in the device to be increased from A to B as shown in (a). Particularly, in the galvanizing process, the galvanizing speed can be increased by increasing the current level.

Explanation will be made now of how the critical breakdown temperature is inferred. The temperature of the control device at a given time point is generally expressed as $$T = Tmax(1 - e^{-At}) \quad (1)$$

where $Tmax$ is the critical breakdown temperature, $1/A$ the time constant for temperature increase, and $t$ time.

If the initial value $To$ is given, equation (1) is expressed as $$T = (Tmax - To)(1 - e^{-At}) + To \quad (2)$$

More current can flow at a time, the larger the time constant that is a parameter for the rate at which the temperature of the control device increases, the relationship between time constant $1/A$ and current $I$ being given as $$I = f(1/A) \quad (3)$$

When the critical breakdown temperature at a given time point obtained upon application of the various on-line data is inserted into equation (2) as a substitute, value $A$ is obtained on condition that the present temperature $T$, initial temperature $To$ and time $t$ are determined. As a result, the current level for the control device that is the optimum current level as shown in B of (a) of FIG. 1 is obtained from equation (3).

Figure 2:
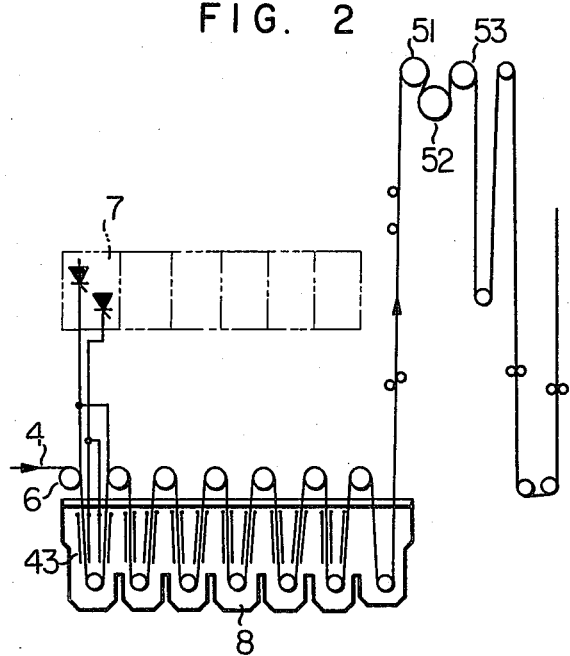
FIG. 2 is a diagram showing a galvanizing plant for explaining an embodiment of the present invention.

A galvanizing plant is shown in FIG. 2. In this figure, an object material to be plated 4 delivered from electric cleaning or another pretreatment stage is introduced to the plating tank 8 by means of the guide rolls 6 and, on completion of plating, is sent to the melting stage through the bridle rolls 51 to 53. In this process, current required to be supplied to the plating electrodes 43 is obtained from the thyristor current source 7.

Figure 3:
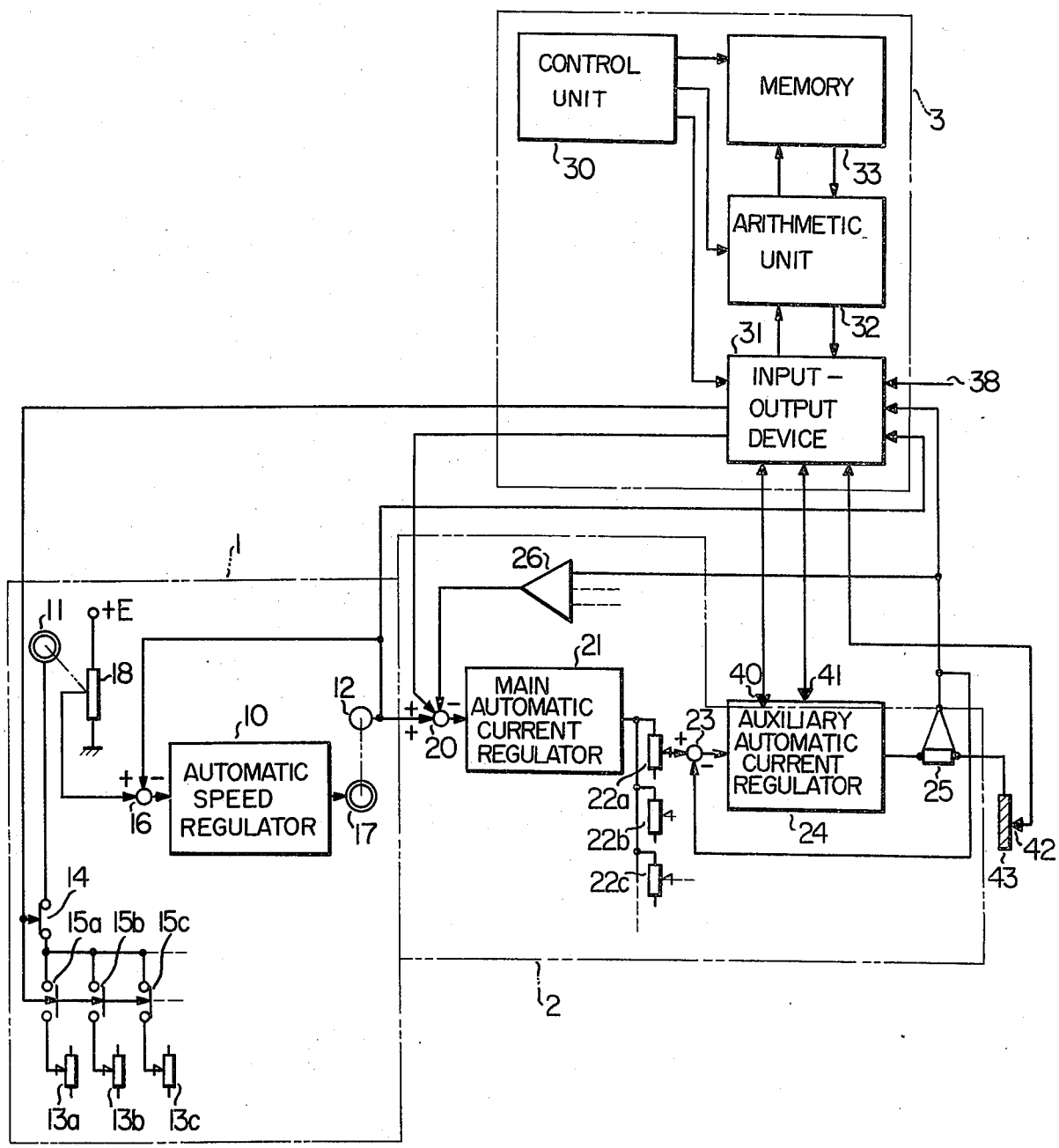
FIG. 3 is a diagram showing the functions of the current source for the galvanizing plant as shown in FIG. 2.

The functions of the current source for a galvanizing plant is shown in FIG. 3, in which instructions on the speed of the galvanizing line are issued, and then instructions in accordance with the actual value of the galvanizing speed are given to the current source.

The chronological on-line data is applied to the input device 31 through the thyristor temperature detector 40, the ambient temperature detector 41 for the main automatic current regulator system, the electrode load condition detector 42 and the manual input means 38. This data is used in the arithmetic unit 32 to calculate the critical breakdown temperature as shown in $c$ of (b) of FIG. 1, while the speed of the galvanizing line is detected by the output of the pilot generator 12. At the same time, the instructions on current, that is, the input to the main automatic current regulator 21 is determined from the equations (1) to (3).

The automatic speed regulating system 1 is provided for the purpose of maintaining the speed of the galvanizing line at a predetermined level, so that the instructions on the speed are given in the form of the output of the potentiometer 18 driven by the control motor 11.

On the other hand, the control motor 11 is controlled in the control motor instructions circuits 13a to 13c by means of a predetermined signal which is passed through the closing contacts 15a to 15c and the opening contact 14. The command output derived from the control motor 11 is applied to the subtractor 16 together with the output of the pilot generator 12 or the actual control value of the output of the automatic speed regulator 10, so that the difference between the command output due to the control motor 11 and the actual control value constitutes a command signal for the automatic speed regulator 10. The automatic speed regulator 10 drives the bridle roll drive motor 17 for determining the speed of the galvanizing line, and the actual value of the output of the bridle roll drive motor is obtained as an output of the pilot generator 12. The output of the pilot generator 12 is applied as a command to the main automatic current regulator 21, the output of which is in turn applied to each electrode control system in the plating tank 5 through the gain distributors 22a to 22c. The output of the gain distributor 22a is applied as an input command to the auxiliary automatic current regulator 24 for the plating electrode 43. The actual value of the output of the auxiliary automatic current regulator 24 is detected as a voltage drop across the detecting resistor 25 connected to the output side of the auxiliary automatic current regulator 24, and is applied not only to the subtractor 23 as a feedback signal of the auxiliary automatic current regulator 24 but to the input-output device 31 of the control calculator 3. Also, the output of the auxiliary automatic current regulator 24 is applied not only to the plating electrode 43 but to the adder 26 which produces a sum of the various actual values as a feedback signal to the main automatic current regulator 21.

The inputs applied to the input-output device 31 include the actual values of the output currents of the power source system for each electrode, the output of the pilot generator 12, the temperature detector 40 for the current source thyristor, the ambient temperature detector 41 for the automatic current regulator and the plating electrode load condition detector 42 as well as the manual input means 38. The data applied to the input-output device 31 is transferred, as required, to the arithmetic unit 32 and the memory 33, while being controlled by the control device 30.

It will be apparent from the above explanation that according to the present invention the control devices are used to the limit of their critical breakdown temperature for an increased current level, resulting in an improved productivity for those products which use electric current as a production means. In the plating processes, for example, an increased current makes possible a higher speed of the plating line, thus contributing to an improved productivity.

Incidentally, it does not depart from the spirit of the present invention if the upper limit of the temperature of the control device is set not at the critical breakdown temperature but at a temperature lower than that.

We claim:

1. An optimum control system for regulating the plating current in and speed of a plating line, said system comprising speed control means for controlling the speed of said plating line, said speed control means including speed detection means for detecting the speed of said plating line, current control means for controlling the plating current of said plating line, said current control means including current detection means for detecting the plating current of said plating line, temperature detection means for detecting the temperature of said current control means, and system control means responsive to said detected speed, current and temperature for continuously regulating said speed control means and said current control means in accordance with a predetermined relationship based on the speed, current and temperature of said plating line, whereby the plating current of said plating line is continuously maintained at a level such that the temperature of said current control means is kept immediately below the critical breakdown temperature of said current control means.

2. An optimum control system as claimed in claim 1 wherein said current control means includes thyristor means for controlling said plating current.

3. An optimum control system as claimed in claim 2 wherein said thyristor means includes a thyristor and said temperature detection means includes means for detecting the temperature of said thyristor.

4. An optimum control system as claimed in claim 3 wherein said temperature detection means further includes means for detecting the ambient temperature of said plating line.

5. An optimum control system as claimed in claim 1 wherein said system control means includes a memory unit for storing the critical breakdown temperature of said current control means, and an arithmetic unit for determining the difference between the temperature of said current control means and said stored critical breakdown temperature.

6. An optimum control system as claimed in claim 1 wherein said temperature detection means includes means for detecting the ambient temperature of said plating line.

* * * * *